US012668239B2

(12) United States Patent
Sano

(10) Patent No.: US 12,668,239 B2
(45) Date of Patent: Jun. 30, 2026

(54) DRIVING SUPPORT DEVICE

(71) Applicant: TOYOTA JIDOSHA KABUSHIKI KAISHA, Toyota (JP)

(72) Inventor: Shunta Sano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 18/479,873

(22) Filed: Oct. 3, 2023

(65) Prior Publication Data

US 2024/0190425 A1     Jun. 13, 2024

(30) Foreign Application Priority Data

Dec. 13, 2022     (JP) ................................. 2022-198446

(51) Int. Cl.
| | |
|---|---|
| *B60W 30/095* | (2012.01) |
| *B60W 10/18* | (2012.01) |
| *B60W 10/20* | (2006.01) |
| *B60W 30/09* | (2012.01) |

(52) U.S. Cl.
CPC ........ *B60W 30/0956* (2013.01); *B60W 10/18* (2013.01); *B60W 10/20* (2013.01); *B60W 30/09* (2013.01); *B60W 2420/403* (2013.01); *B60W 2554/4029* (2020.02)

(58) Field of Classification Search
CPC .. B60W 30/0956; B60W 30/09; B60W 10/18; B60W 10/20; B60W 2420/403; B60W 2554/4029

USPC .......................................................... 701/301
See application file for complete search history.

(56) References Cited

U.S. PATENT DOCUMENTS

| | | | |
|---|---|---|---|
| 7,271,736 B2 * | 9/2007 | Siegel .................. | G08G 1/0965 |
| | | | 340/902 |
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen et al. | |
| 11,001,255 B2 | 5/2021 | Fukuman et al. | |
| 11,110,937 B2 | 9/2021 | Kinoshita et al. | |
| 2017/0327094 A1 | 11/2017 | Inoue et al. | |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2022/0301427 A1 * | 9/2022 | Ueno ...................... | H04N 7/18 |

FOREIGN PATENT DOCUMENTS

JP          6371329 B2     8/2018

* cited by examiner

*Primary Examiner* — Andrew R Dyer
(74) *Attorney, Agent, or Firm* — SoraIP, Inc.

(57)                      ABSTRACT

The driving support device includes a line of sight detection unit that detects a line of sight of an occupant of the first following vehicle on the oncoming lane, a moving person estimation unit that estimates whether or not there is a possibility of a crossing moving person being present around the leading vehicle based on the detected line of sight, and a driving support unit that performs deceleration control of the host vehicle and the like when it is estimated that there is a possibility of a crossing moving person being present.

8 Claims, 6 Drawing Sheets

DRIVING SUPPORT DEVICE

CROSS-REFERENCE TO RELATED APPLICATION

This application claims priority to Japanese Patent Application No. 2022-198446 filed on Dec. 13, 2022, incorporated herein by reference in its entirety.

BACKGROUND

1. Technical Field

The present disclosure relates to a driving support device that performs driving support for a host vehicle.

2. Description of Related Art

When an oncoming vehicle stopped on an oncoming lane in front of a host vehicle is present, it is conceivable that a moving person (a pedestrian, a bicycle, or the like) runs out on a traveling lane from behind the oncoming vehicle (an area that is a blind spot when viewed from the host vehicle). For this reason, in a case in which a blind spot area that cannot be viewed from the host vehicle due to the oncoming vehicle is generated, it is conceivable to perform control such as decelerating the host vehicle. Such a device is described, for example, in Japanese Patent No. 6371329 (JP 6371329 B).

SUMMARY

For example, due to a traffic jam or the like, a plurality of oncoming vehicles may be continuously stopped on the oncoming lane in front of the host vehicle. In this case, deceleration control or the like of the host vehicle is continuously performed when the host vehicle passes by a line of vehicles on the oncoming lane, and it is conceivable that an occupant of the host vehicle finds the control annoying. Therefore, in the present technical field, there is a demand for a driving support device that can more accurately estimate the possibility of the presence of a moving person and more appropriately perform driving support for a host vehicle, in a situation in which a line of vehicles is present on an oncoming lane adjacent to a traveling lane.

One aspect of the present disclosure is a driving support device that performs driving support for a host vehicle in a situation in which a line of vehicles is present on an oncoming lane adjacent to a traveling lane. The driving support device includes: a line of sight detection unit that detects, in a situation in which a first oncoming vehicle and a second oncoming vehicle behind the first oncoming vehicle are present on the oncoming lane in front of the host vehicle, a line of sight of an occupant of the second oncoming vehicle; a moving person estimation unit that estimates whether there is a possibility that a moving person is present around the first oncoming vehicle, based on the detected line of sight; and a driving support unit that performs at least one of notification to an occupant of the host vehicle, steering control of the host vehicle, and deceleration control of the host vehicle, when estimation is made that there is a possibility that the moving person is present.

In the driving support device described above, the moving person estimation unit may estimate that there is a possibility that the moving person is present when the direction of the detected line of sight moves from a blind spot area that is blocked by the first oncoming vehicle and not able to be viewed from the host vehicle, toward the traveling lane side.

According to the aspect of the present disclosure, it is possible to more accurately estimate the possibility of the presence of the moving person and to more appropriately perform the driving support for the host vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, exemplary embodiments will be described with reference to the drawings. In each figure, the same or corresponding elements are designated by the same reference signs, and duplicated description will be omitted.

Figure 1:
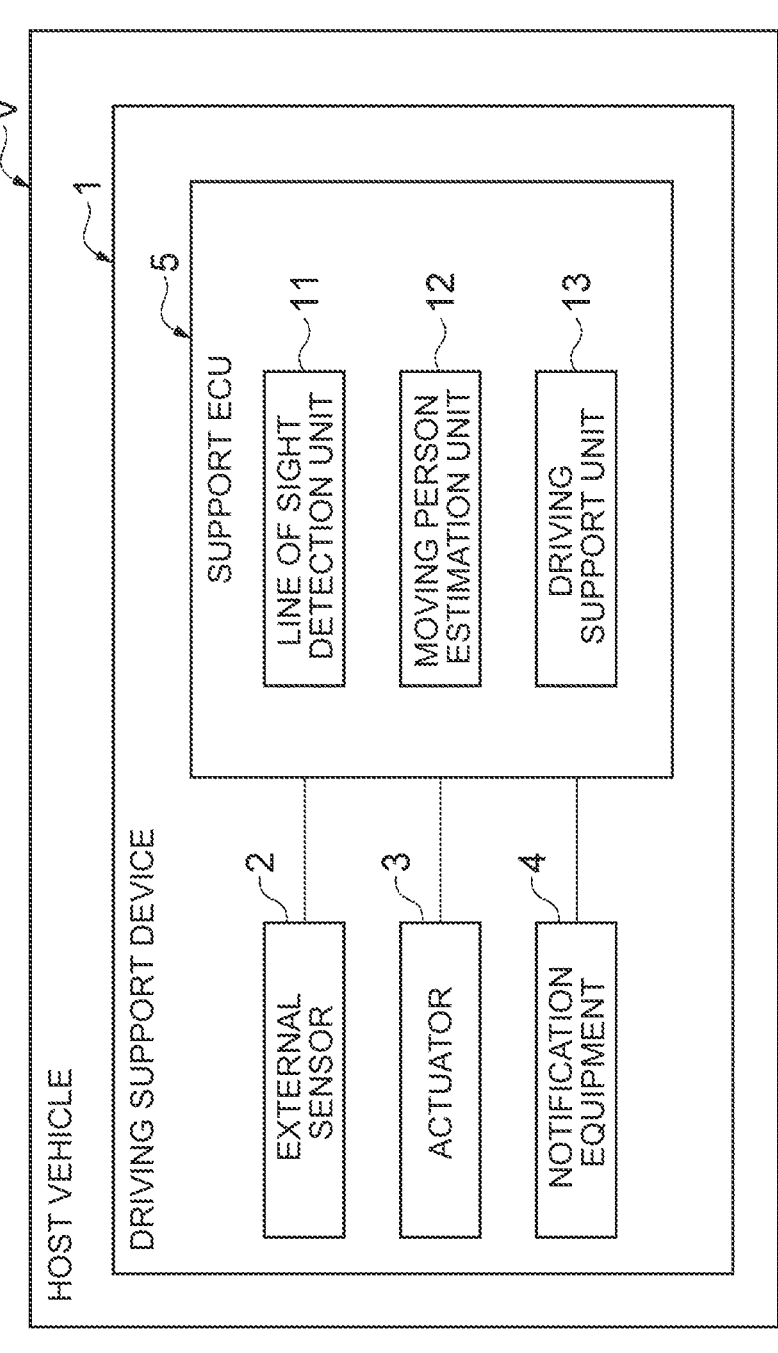
FIG. 1 is a block diagram illustrating an example of a driving support device according to an embodiment.
Figure 2:
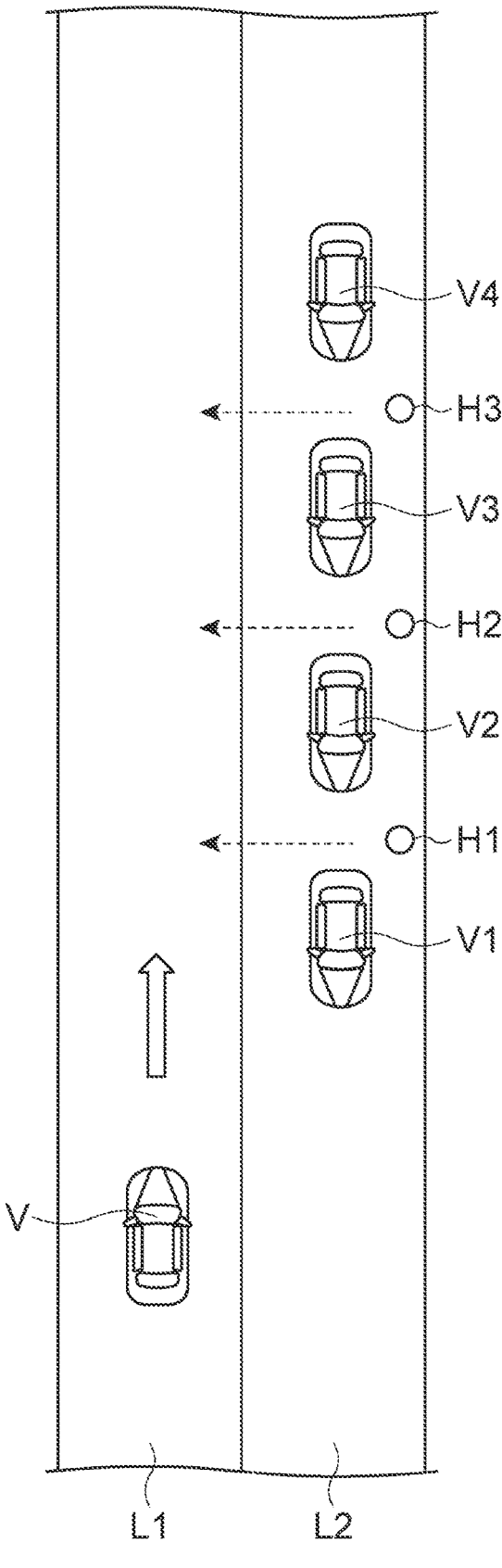
FIG. 2 is a schematic diagram for explaining a situation in which a train of an oncoming vehicle exists on an oncoming lane in front of the host vehicle.

The driving support device 1 illustrated in FIG. 1 performs driving assistance of the host vehicle V. The host vehicle V may be an autonomous vehicle capable of traveling automatically. As illustrated in FIG. 2, the driving support device 1 performs the driving assistance of the host vehicle V in a situation in which a train of the oncoming vehicle exists on the oncoming lane L2 adjoining the traveling lane L1. Note that the oncoming vehicle constituting the train on the oncoming lane L2 is assumed to be the leading vehicle V1, the first following vehicle V2, the second following vehicle V3, and the third following vehicle V4 in order from the head. The third following vehicle V4 from the leading vehicle V1 is stopped on the oncoming lane L2 due to a traffic jam or the like. In the following, a case where a total of four oncoming vehicles from the leading vehicle V1 to the third following vehicle V4 constitute a train on the oncoming lane L2 will be described. However, the number of oncoming vehicles constituting the train on the oncoming lane L2 is not limited to four.

The driving support device 1 performs deceleration control or the like of the host vehicle V in preparation for the crossing moving person jumping out on the traveling lane L1 when the crossing moving person who intends to cross the traveling lane L1 from the oncoming lane L2 is directly detected. Here, the crossing moving person includes a pedestrian, a person riding a bicycle, and the like. In the following, the driving support device 1 estimates the possibility of the presence of the crossing moving person based on the line of sight of the occupant of the oncoming vehicle on the oncoming lane L2, and performs the driving assistance of the host vehicle V in accordance with the estimation result. That is, even in a case where a blind spot region is generated by the oncoming vehicle, the driving support device 1 can estimate whether or not there is a possibility that a crossing moving person exists in the blind spot region by using the line of sight of the occupant of the oncoming vehicle.

Specifically, the driving support device 1 estimates whether or not there is a possibility that there is a crossing moving person H1 who tries to cross the traveling lane L1 through between the leading vehicle V1 and the first following vehicle V2 from within a blind spot area (in the shadow of the vehicle) that is blocked by the leading vehicle V1 and cannot be seen as viewed from the host vehicle V. Similarly, the driving support device 1 estimates whether or not there is a possibility that there is a crossing moving person H2 that tries to cross the traveling lane L1 through between the first following vehicle V2 and the second following vehicle V3 from within a blind spot area that is blocked by the first following vehicle V2 and cannot be seen as viewed from the host vehicle V. Further, the driving support device 1 estimates whether or not there is a possibility that there is a crossing moving person H3 trying to cross the traveling lane L1 through the space between the second following vehicle V3 and the third following vehicle V4 from within the blind spot area that is blocked by the second following vehicle V3 as viewed from the host vehicle V and cannot be seen. When it is estimated that there is a possibility that at least one of H3 is present from the crossing moving person H1, the driving support device 1 performs the driving support of the host vehicle V such as the deceleration control in preparation for the crossing moving person H1 or the like coming out to the traveling lane L1.

As illustrated in FIG. 1, in the present embodiment, the driving support device 1 is mounted on the host vehicle V as an example. The driving support device 1 includes an external sensor 2, an actuator 3, a notification device 4, and a support Electronic Control Unit (ECU) 5.

The external sensor 2 is a detector that detects an external state of the host vehicle V. The external sensor 2 includes a camera that captures at least the front of the host vehicle V. The actuator 3 includes various controllers for controlling the speed and steering of the host vehicle V. The notification device 4 is a device that performs various notifications to the occupant of the host vehicle V. As the notification device 4, for example, a monitor, a speaker, a lamp, or the like can be used.

The support ECU 5 is an electronic control unit having Central Processing Unit (CPU), Read Only Memory (ROM), Random Access Memory (RAM), etc. The support ECU 5 realizes various functions by, for example, loading a program recorded in a ROM into a RAM and executing the program loaded in RAM by a CPU. The support ECU 5 may be composed of a plurality of electronic units. The support ECU 5 functionally includes a line of sight detection unit 11, a moving person estimation unit 12, and a driving support unit 13.

The line of sight detection unit 11 detects the line of sight (the direction of the line of sight) of the occupant (for example, the driver) of the oncoming vehicle on the oncoming lane L2 based on the captured images of the camera of the external sensor 2. The line of sight detection unit 11 can detect the direction of the line of sight of the occupant based on a well-known image processing technique or the like.

More specifically, in a situation in which the leading vehicle (first oncoming vehicle) V1 and the first following vehicle (second oncoming vehicle) V2 exist behind the leading vehicle V1 on the oncoming lane L2 ahead of the host vehicle V, the line of sight detection unit 11 detects the line of sight of the occupant of the first following vehicle V2. Similarly, in a situation where the first following vehicle (first oncoming vehicle) V2 and the second following vehicle (second oncoming vehicle) V3 exist behind the first following vehicle V2 on the oncoming lane L2 ahead of the host vehicle V, the line of sight detection unit 11 detects the line of sight of the occupant of the second following vehicle V3. In addition, in a situation where the second following vehicle (first oncoming vehicle) V3 and the third following vehicle (second oncoming vehicle) V4 exist behind the second following vehicle V3 on the oncoming lane L2 ahead of the host vehicle V, the line of sight detection unit 11 detects the line of sight of the occupant of the third following vehicle V4. As described above, the line of sight detection unit 11 sequentially detects the line of sight of the occupant in each of the third following vehicle V4 from the first following vehicle V2 as the host vehicle V travels.

Based on the line of sight detected by the line of sight detection unit 11, the moving person estimation unit 12 estimates whether or not there is a possibility that a crossing moving person exists around the oncoming vehicle on the oncoming lane L2. Here, for example, when there is a crossing moving person H1 around the leading vehicle V1, it is conceivable that the occupant of the first following vehicle V2 eyes the movement of the crossing moving person H1 around the leading vehicle V1. Therefore, the moving person estimation unit 12 can estimate whether or not there is a possibility of a crossing moving person based on the detected movement of the line of sight.

First, a case of estimating whether or not there is a possibility that the crossing moving person H1 exists around the leading-vehicle V1 will be described. The moving person estimation unit 12 estimates whether or not there is a possibility that the crossing moving person H1 exists around the leading vehicle (first oncoming vehicle) V1 based on the line of sight of the occupant in the first following vehicle (second oncoming vehicle) V2.

More specifically, the moving person estimation unit 12 can estimate whether or not there is a possibility that the crossing moving person H1 exists around the leading vehicle V1 on the basis of the moving direction of the line of sight of the occupant of the first following vehicle V2 detected by the line of sight detection unit 11. Here, when the direction of the line of sight of the occupant of the first following vehicle (second oncoming vehicle) V2 detected by the line of sight detection unit 11 moves toward the traveling lane L1, the moving person estimation unit 12 estimates that there is a possibility that the crossing moving person H1 exists around the leading vehicle (first oncoming vehicle) V1.

Here, the movement of the direction of the line of sight of the occupant toward the traveling lane side may be a monotonous change toward the traveling lane side. The monotonically changing may mean that the direction of the line of sight is constantly changing toward the traveling lane L1 side without turning back from the state in which the direction of the line of sight is moving toward the traveling lane L1 side, toward the oncoming lane L2 side.

In addition, the moving person estimation unit 12 can estimate whether or not there is a possibility that the crossing moving person H1 exists by considering the angular velocity of the change in the line-of-sight direction detected by the line of sight detection unit 11 in addition to the above-described line-of-sight moving direction. Here, if the angular velocity of the change in the line of sight direction when the direction of the line of sight of the occupant of the detected first following vehicle (second oncoming vehicle) V2 moves toward L1 side of the traveling lane is within a predetermined angular velocity range, the moving person estimation unit 12 estimates that there is a possibility that a crossing moving person H1 exists around the leading vehicle (first oncoming vehicle) V1. Here, the angular velocity of the change in the line-of-sight direction is the amount of change in the line-of-sight direction (angle) with respect to time. In addition, the predetermined angular velocity range may be determined based on a change speed of a line-of-sight direction (angle) when an occupant of the first following vehicle V2 eyes a crossing moving person H1 moving between the leading vehicle V1 and the first following vehicle V2.

Further, in addition to the above-described moving direction of the line of sight and/or the angular velocity in line-of-sight direction, the moving person estimation unit 12 can estimate whether or not there is a possibility that the crossing moving person H1 exists, considering which area the direction of the line of sight has moved toward the traveling lane L1. Here, when the direction of the line of sight of the occupant of the detected first following vehicle (second oncoming vehicle) V2 moves from the blind spot area, which is blocked by the leading vehicle (first oncoming vehicle) V1 and cannot be seen when viewed from the host vehicle V, toward the traveling lane L1, the moving person estimation unit 12 estimates that the crossing moving person H1 exists around the leading vehicle (first oncoming vehicle) V1. Note that the case where the direction of the line of sight moves from the blind spot region caused by the leading vehicle V1 toward the traveling lane L1 includes a case where the direction of the line of sight moves from a position other than the blind spot region into the blind spot region and then moves from the blind spot region toward the traveling lane L1.

Similarly, the moving person estimation unit 12 can estimate whether or not there is a possibility that the crossing moving person H2 exists around the first following vehicle V2 and whether or not there is a possibility that the crossing moving person H3 exists around the second following vehicle V3.

Furthermore, the moving person estimation unit 12 can estimate whether or not there is a possibility that there is a crossing moving person who is going to cross the crossing walk based on the presence or absence of a crossing walk ahead of the host vehicle V. The moving person estimation unit 12 can separately estimate the possibility of the crossing moving person based on the line of sight of the occupant of the oncoming vehicle and estimate the possibility of the crossing moving person based on the presence or absence of the crossing pedestrian.

Figure 3:
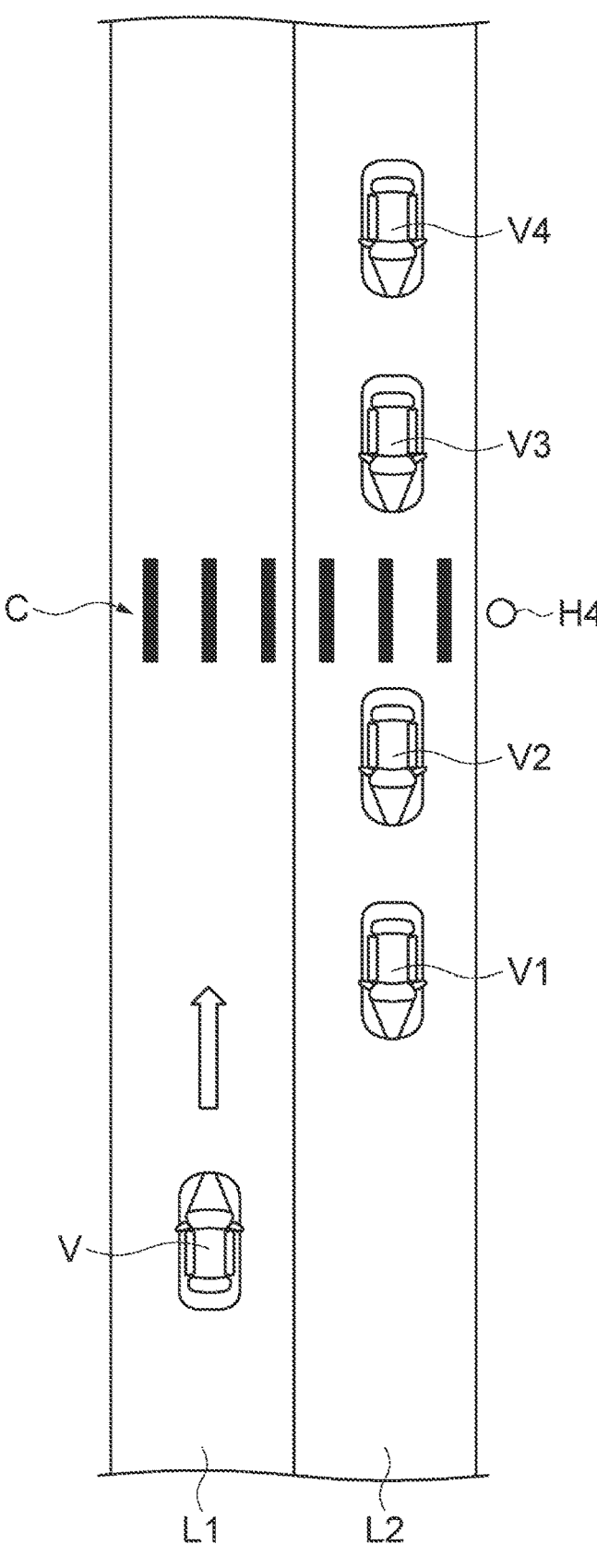
FIG. 3 is a schematic diagram for explaining a situation in which a crosswalk exists in front of a host vehicle.

Specifically, as illustrated in FIG. 3, the moving person estimation unit 12 detects the crosswalk C ahead of the host vehicle V based on the captured image of the camera of the external sensor 2. Here, the crosswalk C crosses between the first following vehicle V2 and the second following vehicle V3. Further, the moving person estimation unit 12 determines whether or not a part of the detected crosswalk C is a blind spot by the oncoming vehicles on the oncoming lane L2. When a part of the crosswalk C becomes a blind spot by the oncoming vehicle, the moving person estimation unit 12 estimates that there is a possibility that there is a crossing traveler. In the embodiment shown in FIG. 3, when viewed from the host vehicle V, a part of the crosswalk C becomes a blind spot due to the first following vehicle V2. Therefore, the moving person estimation unit 12 estimates that there is a possibility that there is a crossing traveler H4 who is going to cross the crosswalk C.

When the moving person estimation unit 12 estimates that there is a possibility of a crossing moving person, the driving support unit 13 performs at least one of notification to an occupant of the host vehicle V, steering control of the host vehicle V. and deceleration control of the host vehicle V. Specifically, the driving support unit 13 notifies the occupant (for example, the driver) of the host vehicle V that there is a crossing moving person by using the notification device 4. The notification may be performed by various methods such as monitor display, sound output, lighting of a lamp, and the like.

Figure 4:
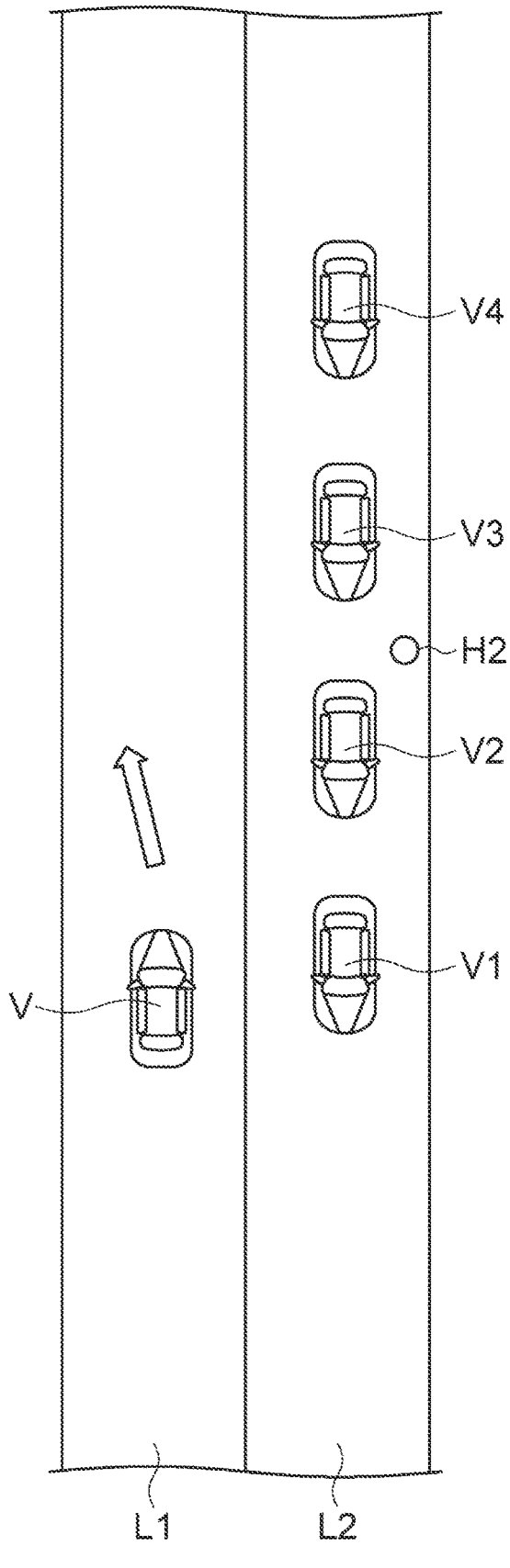
FIG. 4 is a schematic diagram for explaining how steering control is performed based on the possibility of the presence of a crossing moving person.

Further, the driving support unit 13 can perform deceleration control and steering control of the host vehicle V by outputting a control signal or the like to the actuator 3. The driving support unit 13 decelerates the host vehicle V in advance by the deceleration control, so that the host vehicle V can be easily stopped immediately even if the crossing moving person jumps out on the traveling lane L1. Further, the steering control performed by the driving support unit 13 may be to control the steering of the host vehicle V so that the distance between the host vehicle V and the oncoming lane L2 increases in the vehicle width-direction. For example, as shown in FIG. 4, it is assumed that there is a possibility that the crossing moving person H2 exists around the first following vehicle V2 based on the line of sight of the occupant of the second following vehicle V3. In this case, the driving support unit 13 performs steering control for moving the host vehicle V to the left side so that the distance between the host vehicle V and the oncoming lane L2 is increased (away from the train on the oncoming lane L2).

Figure 5:
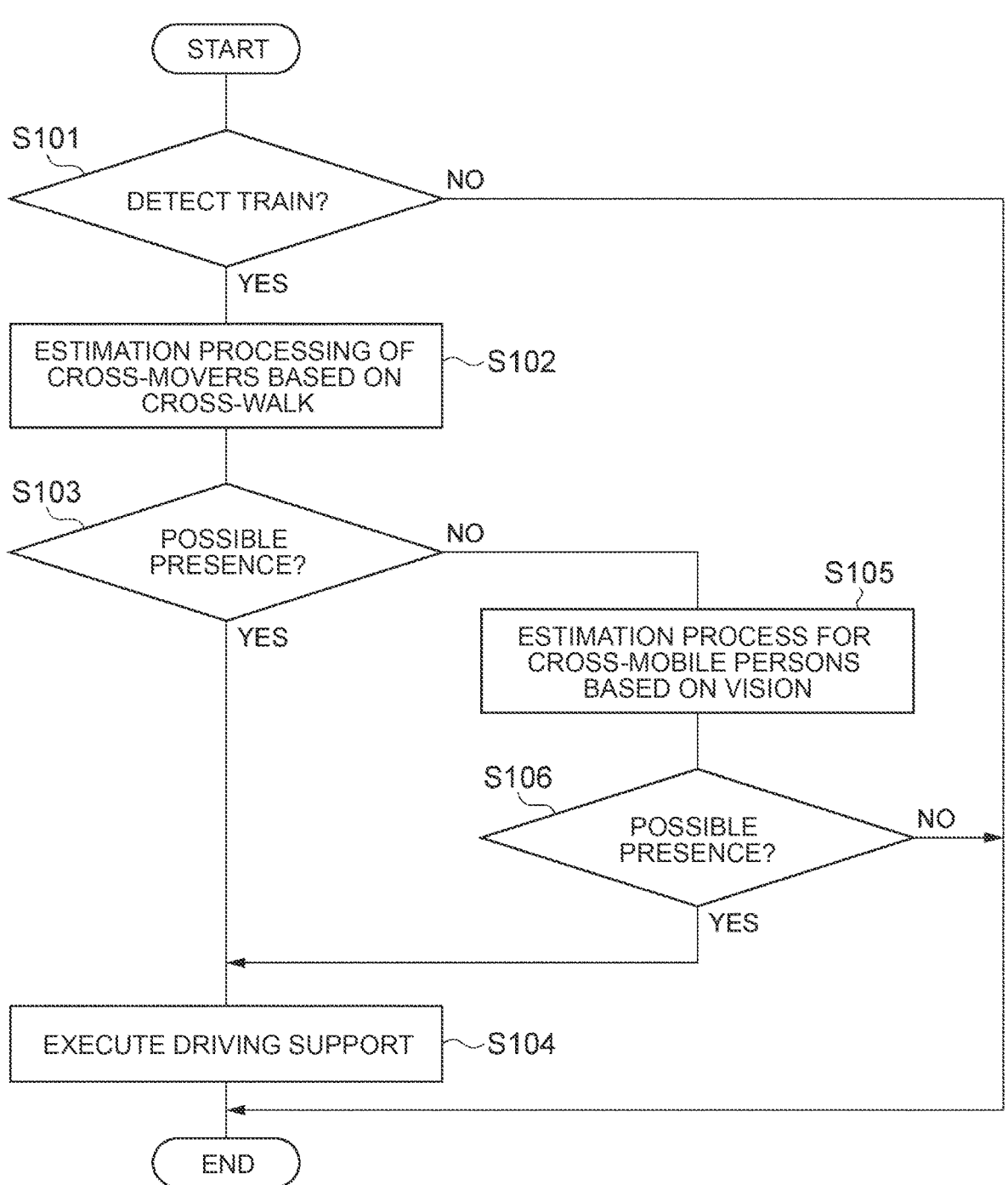
FIG. 5 is a flowchart illustrating a flow of a process of driving assistance control based on an estimation result of a crossing moving person.

Next, a flow of a process of driving assistance control based on an estimation result of a crossing moving person performed in the driving support device 1 will be described. The process illustrated in FIG. 5 is repeatedly executed, for example, after the host vehicle V is in the travelable state (for example, after the ignition switch is in the ON state). In the process illustrated in FIG. 5, when the process reaches the end, the process is started again after a predetermined time.

As illustrated in FIG. 5, the line of sight detection unit 11 determines whether or not there is a train of the oncoming vehicle on the oncoming lane L2 ahead of the host vehicle V based on the captured images of the cameras of the external sensor 2 (S101). When the train does not exist (S101: NO), the driving support device 1 starts the process from the restart after a predetermined period of time. On the other hand, when there is a train (S101: YES), the moving person estimation unit 12 estimates whether there is a possibility that there is a crossing traveler who is going to cross the crossing pedestrian based on the presence or absence of the crossing pedestrian (S102). The flow of the process in this S102 will be described later.

The driving support unit 13 determines whether there is a possibility that there is a crossing moving person in S102 process (S103). When there is a possibility that there is a crossing moving person (S103: YES), the driving support unit 13 performs driving assistance such as decelerating the host vehicle V at a position in front of the crossing pedestrian (S104).

When it is determined in S103 that there is no possibility of a crossing moving person (S103: NO), the moving person estimation unit 12 estimates whether there is a possibility of a crossing moving person existing around the oncoming vehicle on the basis of the line of sight of the occupant of the oncoming vehicle (S105). The flow of the process in this S105 will be described later. The driving support unit 13 determines whether there is a possibility that there is a crossing moving person in S105 process (S106). When there is a possibility that there is a crossing moving person (S106: YES), the driving support unit 13 performs S104 process. On the other hand, when it is determined in S106 that there is no possibility of a crossing moving person (S106: NO), the driving support device 1 starts the process from the restart after a predetermined period of time.

Figures 6A, 6B:
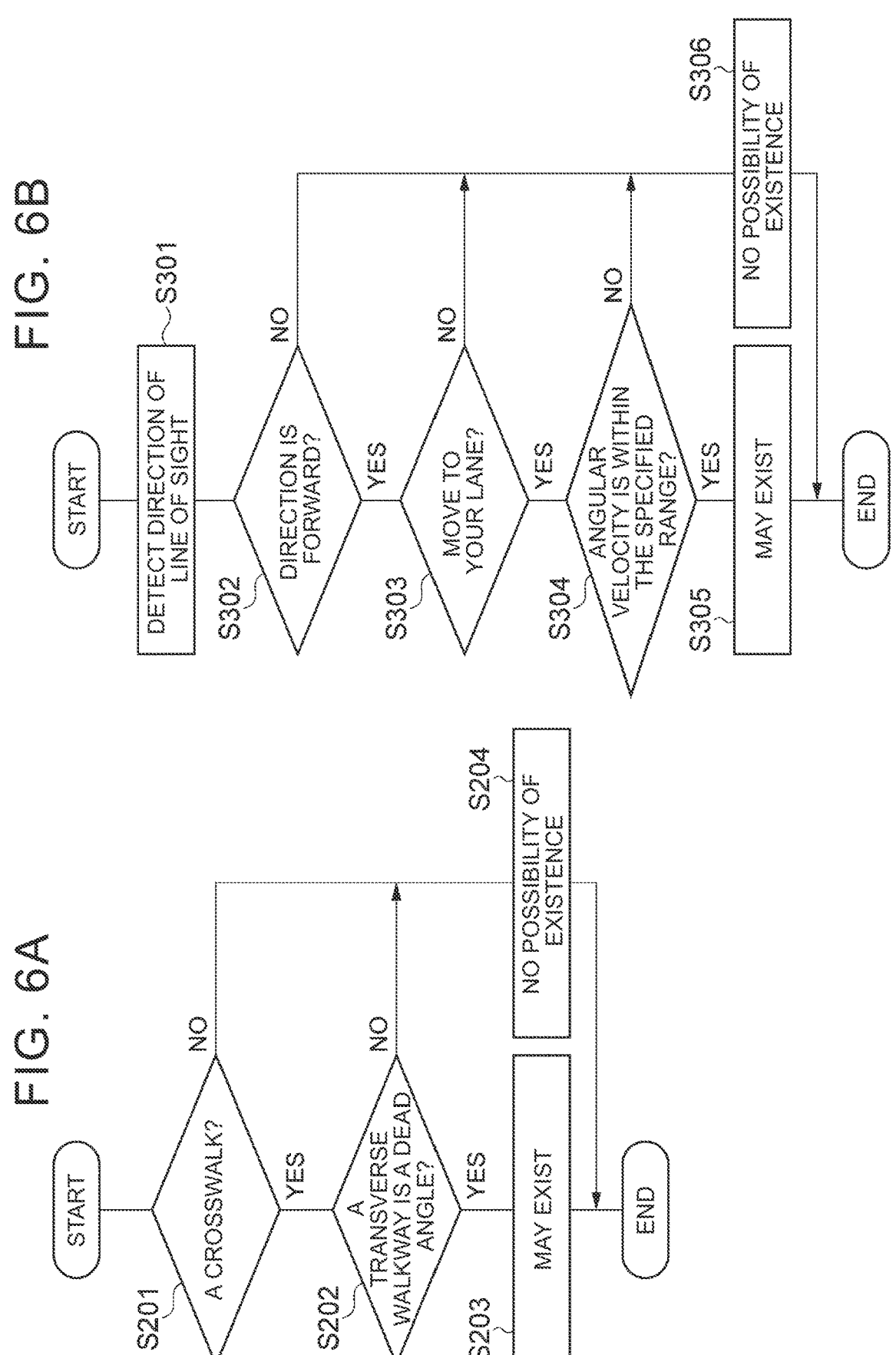
FIG. 6A is a flow chart showing a flow of a process of estimating whether or not there is a possibility of a crossing moving person based on the presence or absence of a crosswalk.
FIG. 6B is a flow chart illustrating a flow of a process of estimating whether or not there is a possibility of a crossing moving person based on a line of sight of an occupant of an oncoming vehicle.

Next, a detailed flow of the process performed in S102 of FIG. 5 will be described. As illustrated in FIG. 6A, the moving person estimation unit 12 performs a process of detecting a crosswalk ahead of the host vehicle V based on captured images of the cameras of the external sensor 2 (S201). When a crosswalk is detected (S201: YES), the moving person estimation unit 12 determines whether or not a part of the crosswalk is a blind spot by the oncoming vehicles on the oncoming lane L2 (S202). When a part of the crosswalk is a blind spot (S202: YES), the moving person estimation unit 12 estimates that there is a possibility that there is a crosswalk traveler who is going to cross the crosswalk (S203).

On the other hand, in S201 process, when the crosswalk is not detected, the moving person estimation unit 12 estimates that there is no possibility that there is a crosswalk traveler who is going to cross the crosswalk (S204). In addition, in S202 process, when it is determined that all the crosswalks can be viewed and there is no blind spot on the crosswalk (S202: NO), the moving person estimation unit 12 estimates that there is no possibility that a crosswalk traveler exists (S204).

Next, a detailed flow of the process performed in S105 of FIG. 5 will be described. As shown in FIG. 6B, the line of sight detection unit 11 detects the line-of-sight of the occupant of the oncoming vehicle on the oncoming lane L2 based on the captured images of the cameras of the external sensor 2 (S301). The moving person estimation unit 12 determines whether or not the line of sight of the occupant of the oncoming vehicle faces forward (S302). When the line of sight of the occupant faces forward (S302: YES), the moving person estimation unit 12 determines whether or not the line of sight of the occupant is moving toward the traveling lane L1 (S303). Here, the moving person estimation unit 12 can determine whether or not the line of sight of the occupant is monotonously moving toward the traveling lane L1. In this case, the moving person estimation unit 12 can determine whether or not the line of sight of the occupant of the oncoming vehicle is moving from the blind spot area, which is a blind spot as viewed from the host vehicle V, toward the traveling lane L1.

When the line of sight of the occupant is moving toward the traveling lane L1 (S303: YES), the moving person estimation unit 12 determines whether or not the angular velocity of the change in the line-of-sight direction moving toward the traveling lane L1 is within a predetermined angular velocity range (S304). When the angular velocity of the change in the line-of-sight direction is within the predetermined angular velocity range (S304: YES), the moving person estimation unit 12 estimates that there is a possibility that a crossing moving person exists around the oncoming vehicle on the oncoming lane L2 (S305).

On the other hand, when the line of sight of the occupant does not face forward (S302: YES), the moving person estimation unit 12 estimates that there is no possibility that a crossing moving person exists around the oncoming vehicle on the oncoming lane L2 (S306). In addition, when it is determined in S303 process that the line of sight of the occupant is not moving toward the traveling lane L1 (S303: NO), the moving person estimation unit 12 estimates that there is no possibility that a crossing moving person exists around the oncoming vehicle on the oncoming lane L2 (S306). Further, when it is determined in S304 process that the angular velocity of the change in the line-of-sight direction is not within the predetermined angular velocity range (S304: NO), the moving person estimation unit 12 estimates that there is no possibility that a crossing moving person exists around the oncoming vehicle on the oncoming lane L2 (S306).

As described above, the line of sight detection unit 11 detects the line of sight of the occupant on the oncoming lane. Then, the moving person estimation unit 12 estimates, based on the detected line of sight of the occupant of the oncoming vehicle, whether or not there is a possibility that a crossing moving person exists around the oncoming vehicle in front of the oncoming vehicle. Thus, even if the driving support device 1 cannot directly detect the crossing moving person by the external sensor 2 or the like because the vehicle is in the blind spot, it is possible to more accurately estimate whether or not there is a possibility that the crossing moving person exists based on the line of sight of the occupant of the oncoming vehicle. As a result, the driving support device 1 can more accurately estimate the possibility of the presence of the crossing moving person, and can more appropriately execute the driving assistance of the host vehicle V.

When the line of sight of the occupant of the oncoming vehicle moves toward the traveling lane L1, the moving person estimation unit 12 estimates that there is a possibility that a crossing moving person exists. Here, it is conceivable that the occupant of the oncoming vehicle eyes the movement of the crossing moving person when the crossing moving person is present. In other words, the case where the line of sight of the occupant of the oncoming vehicle moves toward the traveling lane L1 can be said to be a case where there is a higher possibility that there is a crossing moving person moving toward the traveling lane L1. As described above, the driving support device 1 estimates the traveling direction of the line of sight of the occupant of the oncoming vehicle based on the traveling direction of the line of sight of the occupant of the oncoming vehicle, and thus it is possible to more accurately estimate the crossing moving person who is highly likely to jump out on the traveling lane L1 and who is highly required to perform the driving assistance by the driving support unit 13.

When the angular velocity of the change in the line-of-sight direction when the line-of-sight direction of the occupant of the oncoming vehicle moves toward the traveling lane L1 is within a predetermined angular velocity range, the moving person estimation unit 12 estimates that a crossing moving person exists. In this case, the moving person estimation unit 12 can estimate the possibility of the crossing moving person with higher accuracy, excluding the case where the occupant of the oncoming vehicle is looking at an object other than the crossing moving person.

When the direction of the line of sight of the occupant of the oncoming vehicle moves from the blind spot area, which becomes the blind spot as viewed from the host vehicle V, toward the traveling lane L1, the moving person estimation unit 12 estimates that there is a crossing moving person. In this case, the driving support device 1 can more accurately estimate the possibility that a crossing moving person exists in the blind spot region.

Although the embodiments of the present disclosure have been described above, the present disclosure is not limited to the above-described embodiments.

What is claimed is:

1. A driving support device that performs driving support for a host vehicle in a situation in which a line of vehicles is present on an oncoming opposite lane adjacent to a traveling lane, the driving support device comprising:

a camera mounted on the host vehicle; and a processor configured to acquire captured images from the camera, perform an estimation process including in a situation in which a first oncoming vehicle and a second oncoming vehicle behind the first oncoming vehicle are present on the opposite lane in front of the host vehicle, detecting a line of sight of an occupant of the second oncoming vehicle based on the captured images, and determining whether there is a possibility that a moving person is present around the first oncoming vehicle, based on the detected line of sight, wherein the determining whether there is a possibility that a moving person is present around the first oncoming vehicle based on the detected line of sight includes determining whether the detected line of sight is directed forward in a longitudinal direction of the second oncoming vehicle, determining whether the detected line of sight moves toward a traveling lane side in response to determining that the detected line of sight is directed forward in the longitudinal direction, and determining whether an angular velocity of a change in a direction of the detected line of sight is within a predetermined range, in response to determining that the detected line of sight moves toward the traveling lane side, and the determination is made that there is a possibility that the moving person is present, in response to determining that the angular velocity is within the predetermined range, and perform at least one of notification to an occupant of the host vehicle, steering control of the host vehicle, and deceleration control of the host vehicle, in a case where a determination is made that there is a possibility that the moving person is present.

2. The driving support device according to claim 1, wherein the determination is made that there is a possibility that the moving person is present, in a case where a direction of the detected line of sight moves toward a traveling lane side.

3. The driving support device according to claim 2, wherein the determination is made that there is a possibility that the moving person is present, in a case in which an angular velocity of a change in a line-of-sight direction in a case where the direction of the detected line of sight moves toward the traveling lane side is within a predetermined angular velocity range.

4. The driving support device according to claim 2, wherein the determination is made that there is a possibility that the moving person is present, in a case where the direction of the detected line of sight moves from a blind spot area that is blocked by the first oncoming vehicle and not able to be viewed from the host vehicle, toward the traveling lane side.

5. The driving support device according to claim 1, wherein the predetermined range is determined based on a speed of changing a direction of the line of sight of the occupant of the second oncoming vehicle in a case where the occupant of the second oncoming vehicle follows the moving person moving between the first oncoming vehicle and the second oncoming vehicle with eyes of the occupant of the second oncoming vehicle.

6. The driving support device according to claim 1, wherein the steering control of the host vehicle is performed to increase a distance between the host vehicle and the opposite lane in a vehicle width-direction.

7. The driving support device according to claim 1, wherein the processor is further configured to:

detect a crosswalk in front of the host vehicle based on the captured images;

determine whether the detected crosswalk has a blind spot area that is blocked by the line of vehicles, and perform at least one of the notification to the occupant of the host vehicle, the steering control of the host vehicle, and the deceleration control of the host vehicle, in a case where a determination is made that the detected crosswalk has the blind spot area.

8. The driving support device according to claim 7, wherein the estimation process is performed in a case where a determination is made that the detected crosswalk has no blind spot area.

\* \* \* \* \*